Patented Mar. 31, 1953

2,633,461

UNITED STATES PATENT OFFICE 2,633,461

DIAZONIUM COMPOUNDS

Wilhelm Seidenfaden and Franz Muris, Offenbach-on-the-Main, Germany, assignors to Naphtol-Chemie Offenbach, Offenbach-on-the-Main, Germany No Drawing. Application March 24, 1951, Serial No. 217,406. In Germany March 27, 1950

8 Claims. (Cl. 260—142)

1

This invention relates to a process for the manufacture of diazonium compounds made from 2-amino-azo compounds.

It is an object of this invention to provide for a process for the preparation of such diazonium compounds which are more readily soluble in water than the hitherto known diazonium compounds made from 2-amino-azo compounds.

It is another object of this invention to provide for a process for diazotizing 2-amino-azo compounds by using acids of a considerably lower concentration than the concentrations hitherto necessary for diazotizing 2-amino-azo compounds of the type used up to now for the preparation of such diazonium compounds.

This invention relates to the preparation of diazonium compounds made from 2-amino-azo compounds of the following general formula:

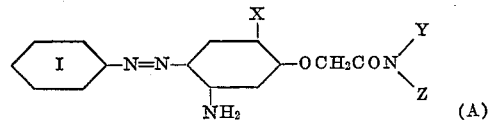

wherein at least on of the hydrogen atoms of the phenyl nucleus I is replaced by a substituent of the group consisting of Cl, $NO_2$, $OCH_3$, CN, X stands for a member of the group consisting of alkyl, alkoxy and halogen, and Y stands for a member of the group consisting of hydrogen and alkyl, whereas Z stands for an alkyl radical.

This invention more particularly relates to the preparation of diazonium compounds made from 2-amino-azo compounds of the following general formula:

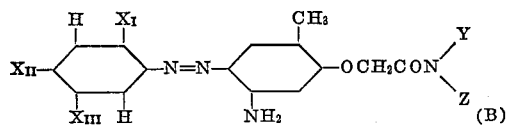

wherein $X_I$ stands for a substituent of the group consisting of H, Cl, $NO_2$, $OCH_3$, $X_{II}$ stands for a substituent of the group consisting of H, $NO_2$, CN, $X_{III}$ stands for a substituent of the group consisting of H, Cl, $OCH_3$, at least one of the substituents $X_I$, $X_{II}$ and $X_{III}$ standing for a substituent other than H; and wherein Y and Z stand for a substituent of the group consisting of $CH_3$ and $C_2H_5$.

It is known to use as components for the manufacture of azo dyestuffs 2-amino-azo compounds of the following general formula:

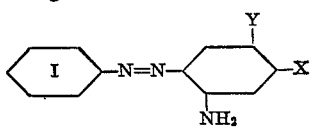

2 wherein X stands for alkoxy, Y for alkyl, alkoxy or halogen and wherein the benzene nucleus I may contain substituents. These compounds can be diazotized only under energetic conditions, and the diazonium compounds so obtained are always of relatively low solubility.

In order to diazotize such bases it is necessary to work in highly concentrated hydrochloric or sulphuric acid or with the addition of solution promoters such, for example, as acetic acid. These methods necessitate the use of special measures, such as the removal of gases, for example hydrogen chloride gas, which are injurious to health and strongly corrosive, or the protection of the apparatus against the attack of concentrated sulphuric acid or nitrosyl-sulphuric acid, so that the process is not suitable for general application and is hardly economical.

Furthermore, in many cases the low solubility of the diazonium compounds renders difficult their extensive application for the production of dyestuffs on the fibre, for example, as supplementary additions in working with standing baths or for the production of strong developing solutions such as are used in printing for producing deep tints.

Now we have found that 2-amino-azo compounds of the following general formula:

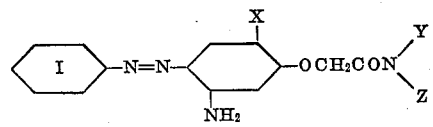

wherein at least one of the hydrogen atoms of the phenyl nucleus I is replaced by a substituent of the group consisting of Cl, $NO_2$, $OCH_3$, CN, X stands for a member of the group consisting of alkyl, alkoxy and halogen, and Y stands for a member of the group consisting of hydrogen and alkyl, whereas Z stands for an alkyl radical, can be diazotized already with moderately concentrated mineral acids, especially with hydrochloric acid, or with sulphuric acid or nitric acid.

For instance, hydrochloric acid may be used for diazotizing the said bases in such concentrations which do not evolve hydrogen chloride gas at ordinary temperature, i. e. having a content of about 15 to 20 per cent of HCl. Sulphuric acid, for instance, may be used in concentrations up to 75 or 80 per cent of $H_2SO_4$.

It is evident that this possibility to carry out the diazotization process with acids of considerably lower concentrations than hitherto used for diazotizing comparable 2-amino-azo compounds, enables the diazotization to be made more economically and commercially with greater ease.

Besides, the diazonium compounds made from the new bases are more easily soluble than those which contain an alkoxy group instead of the dialkylamino substituted oxyacetic acid residue. This improved solubility favors a general application of the new diazonium compounds.

The aromatic amines of the general formula

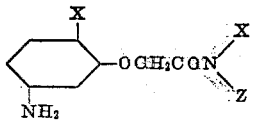

used as starting materials can be obtained, for example, in the following manner

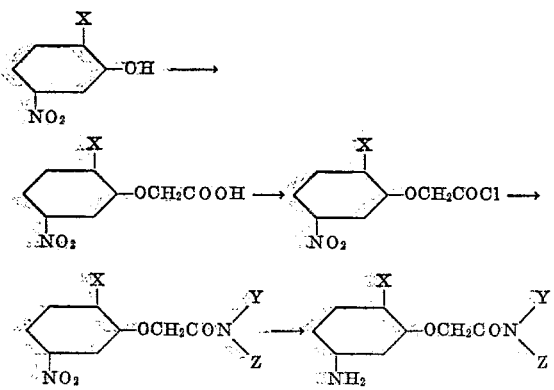

Since the essential feature of the invention consists in replacing the 4-alkoxy group of the hitherto used 2-amino-azo compounds by an oxyacetic acid residue being substituted in the carboxylic acid group by an alkylated amino group, the substitution of the compounds described herein may be varied in other directions to a considerable extent without leaving the scope of this invention.

For instance, instead of using a dialkylamino substituted oxyacetic acid residue wherein both alkyl groups are of the same constitution, one may use compounds having two different alkyl groups in the amino group. There can also be used mono-alkyl derivatives of the oxyacetic acid substituted 2-amino-azo compound.

Likewise, the substitution of the phenyl nucleus I (Formula A) may be varied in addition to the examples given herein; it may also be unsubstituted.

The substituent X of Formula A may, for instance, be methyl or ethyl, methoxy or ethoxy or a halogen atom, especially Cl.

This invention is not restricted to the use of mineral acids in moderate concentrations. It is obvious that the same bases can be diazotized also by applying stronger concentrations of the acids. However, it is an essential advantage of the new process that the herein described new 2-amino-azo compounds can be diazotized in much weaker concentrations of acids than the hitherto used 2-amino-azo compounds substituted by a 4-alkoxy group in meta-position to the amino group to be diazotized. Besides, the new diazonium compounds themselves are distinguished over the hitherto known comparable compounds by an essentially greater solubility which facilitates their application.

The following examples illustrate the invention, the parts being by weight unless otherwise stated and the relationship of parts by weight to parts by volume being the same as that of the kilogram to the litre:

Example 1

24 parts by volume of a solution of sodium nitrite of 30 per cent strength are added dropwise in the course of 30 minutes, while stirring well, to a suspension of 42.4 parts of finely ground 2-amino-5-methyl-4'-nitro-2-chlor-azobenzene-4-oxyacetic acid-diethylamide in 600 parts of hydrochloric acid of 17.7 per cent strength at 15–20° C. After stirring for a further ½ hour the diazotization ceases, the diazo solution is freed from a small amount of turbidity by stirring it for a short time with 3 parts of kieselguhr followed by filtering with suction. Into the resulting clear yellowish red diazo solution are run in the course of 30 minutes 19 parts by volume of zinc chloride solution of 48 per cent strength, whereby the diazonium chloride-zinc chloride double salt is formed, and the latter is isolated by filtering with suction and dried. 82 parts of the diazonium compound of the formula:

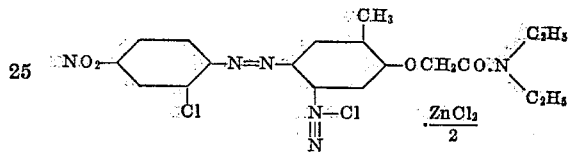

are obtained having a purity of 46.5 per cent calculated on the base having a molecular weight of 419.5, which represents a yield of 91 per cent of the theoretical yield. The diazonium compound so obtained has a solubility of 15 grams of the base in 1 litre of water.

A comparable product which contains, instead of the oxyacetic acid residue, a methoxy group, namely 2-amino-4-methoxy-5-methyl-4'-nitro-2'-chlorazobenzene, can be diazotized satisfactorily only with the use of 25 times the quantity of hydrochloric acid of 25 per cent strength, and the diazonium chloride-zinc chloride double salt has a solubility of only 7.2 grams in 1 litre of water.

A comparison of the solubilities of the corresponding diazonium chlorides shows a similar result, namely 28 grams per litre in the case of the compound

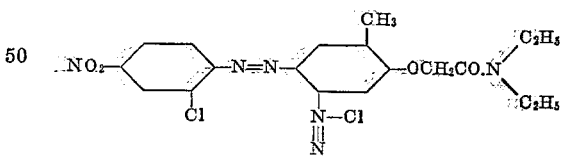

as compared with 16 grams per litre in the case of the compound

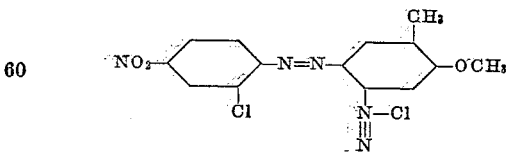

Example 2

43 parts of 2-amino-5-methyl-2':4'-dinitro-azobenzene-4-oxyacetic acid-diethylamide are treated in the manner described in Example 1, and there is obtained a diazonium chloride-zinc chloride double salt having a solubility of 21 grams in 1 litre of water. The diazonium chloride itself has a solubility of 36.4 grams in 1 litre of water.

The comparable 2-amino-4-methoxy-5-methyl-2':4'-dinitro-azobenzene can be diazotised well only with sodium nitrite solution in a mixture of hydrochloric acid and glacial acetic acid or with nitrosyl sulphuric acid in concentrated sulphuric acid. The solubility of its diazonium chloride-zinc chloride double salt is 8 grams in 1 litre of water and that of the diazonium chloride is 15 grams in 1 litre of water.

In the following table are given the solubilities of further examples of diazonium compounds prepared in accordance with the invention as compared with those of the comparable 4-methoxy-compounds.

| | | Solubility in grams of base per litre | |
|---|---|---|---|
| | | the diazonium chloride | the diazonium chloride-zinc chloride double salt |
| Diazonium compound of: | 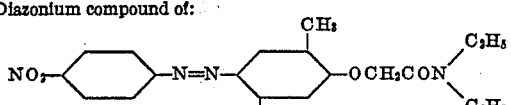 | 20.9 | 13.0 |
| as compared with: | 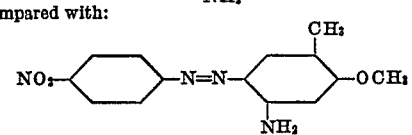 | 11.5 | 7.0 |
| Diazonium compound of: | 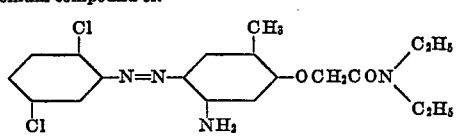 | 14.1 | 9.0 |
| as compared with: | 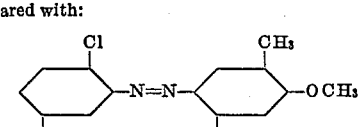 | 4.0 | 3.6 |
| Diazonium compound of: | 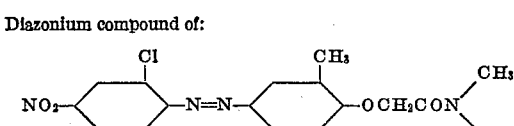 | 23.2 | 14.0 |
| as compared with: | 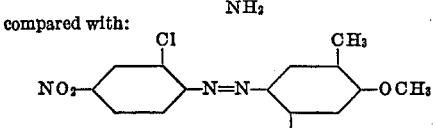 | 16.0 | 7.2 |
| Diazonium compound of: | 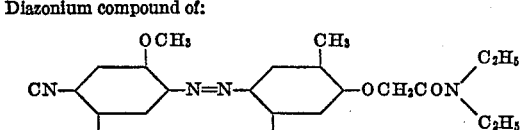 | 28.6 | 17.6 |
| as compared with: | 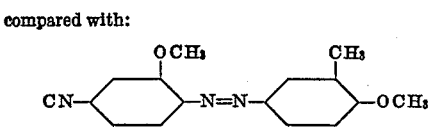 | 8.8 | 5.5 |
| Diazonium compound of: | 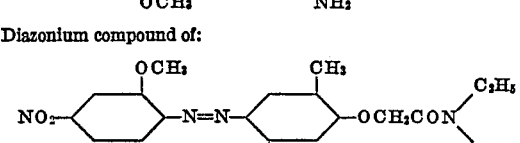 | 39.0 | 19.8 |
| as compared with: | 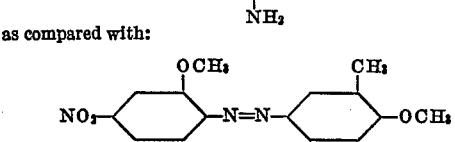 | 14.0 | 8.2 |

We claim:
1. Diazonium compounds of the class consisting of those having the following general formula

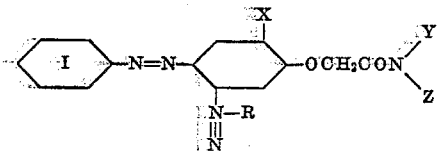

wherein at least one of the hydrogen atoms of the phenyl nucleus I is replaced by a substituent of the group consisting of Cl, $NO_2$, $OCH_3$, CN, X stands for a member of the group consisting of alkyl, alkoxy and halogen, and Y stands for a member of the group consisting of hydrogen and alkyl, whereas Z stands for an alkyl radical, and wherein R is an anion of a mineral acid, and the zinc chloride double salts of such compounds.

2. Diazonium compounds of the class consisting of those having the following general formula

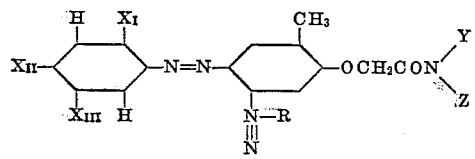

wherein $X_I$ stands for a substituent of the group consisting of H, Cl, $NO_2$, $OCH_3$, $X_{II}$ stands for a substituent of the group consisting of H, $NO_2$, CN, $X_{III}$ stands for a substituent of the group consisting of H, Cl, $OCH_3$, at least one of the substituents $X_I$, $X_{II}$ and $X_{III}$ standing for a substituent other than H; and wherein Y and Z stands for a substituent of the group consisting of $CH_3$ and $C_2H_5$, and wherein R is an anion of a mineral acid, and the zinc chloride double salts of such compounds.

3. Diazonium compounds of the class consisting of those having the following general formula:

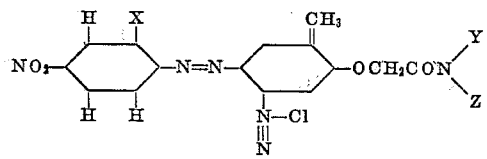

wherein X stands for a substituent of the group consisting of H, Cl, $NO_2$, $OCH_3$, and Y and Z stand for the same substituent of the group consisting of $CH_3$ and $C_2H_5$, and the zinc chloride double salts of such compounds.

4. A diazonium compound of the following structural formula:

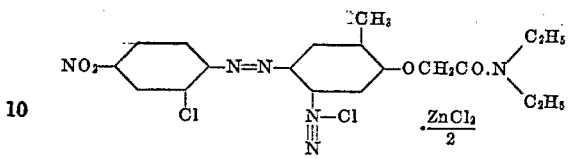

5. A diazonium compound of the following structural formula:

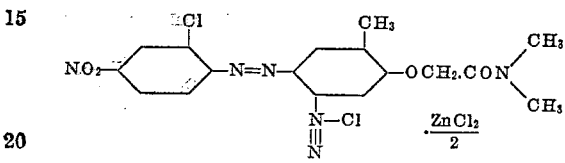

6. A diazonium compound of the following structural formula:

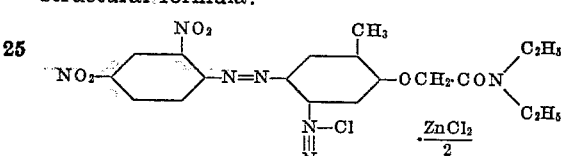

7. A diazonium compound of the following structural formula:

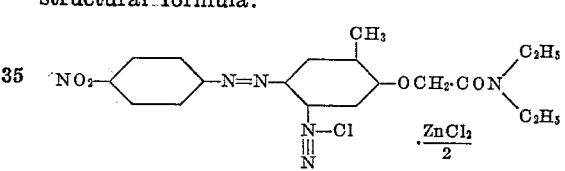

8. A diazonium compound of the following structural formula:

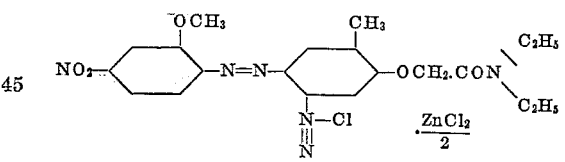

WILHELM SEIDENFADEN.
FRANZ MURIS.

No references cited.